United States Patent
Taubman

[19]
[11] Patent Number: 6,122,017
[45] Date of Patent: Sep. 19, 2000

[54] METHOD FOR PROVIDING MOTION-COMPENSATED MULTI-FIELD ENHANCEMENT OF STILL IMAGES FROM VIDEO

[75] Inventor: David S. Taubman, Redwood City, Calif.

[73] Assignee: Hewlett-Packard Company, Palo Alto, Calif.

[21] Appl. No.: 09/010,803

[22] Filed: Jan. 22, 1998

[51] Int. Cl.$^7$ .................................................. H04N 5/21
[52] U.S. Cl. ........................ 348/620; 348/621; 348/451; 348/452
[58] Field of Search .................................. 348/624, 607, 348/618, 619, 620, 621, 441, 443, 446, 448, 449, 451, 452, 459, 584; H04N 5/21, 7/01

[56] References Cited

U.S. PATENT DOCUMENTS

| | | | |
|---|---|---|---|
| 5,185,664 | 2/1993 | Darby | 348/620 |
| 5,191,413 | 3/1993 | Edgar | 348/701 |
| 5,309,243 | 5/1994 | Tsai | 348/221 |
| 5,341,174 | 8/1994 | Winans et al. | 348/576 |
| 5,579,054 | 11/1996 | Sezan | 348/452 |
| 5,642,170 | 6/1997 | Hacket et al. | 348/459 |
| 5,784,115 | 7/1998 | Bozdagi | 348/452 |

FOREIGN PATENT DOCUMENTS

| | | | |
|---|---|---|---|
| 0 454 442 | 4/1991 | European Pat. Off. | G06F 15/70 |
| 0474285A1 | 3/1992 | European Pat. Off. | |
| 0661667A1 | 12/1994 | European Pat. Off. | |
| 0648046A2 | 4/1995 | European Pat. Off. | |
| 0 785 683 | 1/1997 | European Pat. Off. | H04N 7/01 |
| 1138858A | 5/1989 | Japan . | |
| 1138859A | 5/1989 | Japan . | |
| WO 95/25404 | 3/1995 | WIPO | H04N 7/36 |

OTHER PUBLICATIONS

European Search Report, Application No. EP 98 11 6451, dated Jul. 30, 1999.
Natarajan B., et al., "Low–Complexity Block–Based Motion Estimation Via One–Bit Transforms",datedAug. 1, 1997, pp. 702–706.
Seongsoo, et al., "Two–Step Motion Estimation Algorithm Using Low–Resolution Quantization", dated Sep. 16, 1996, pp. 795–798.
Eiji Ogura, et al., "A Cost Effective Motion EstimationProcessor LSI Using A Simple And Efficient Algorithm", dated Aug. 1, 1995, pp. 690–696.
Siu–Leong Iu, "Comparison Of Motion Compensation Using Different Degrees Of Sub–Pixel Accuracy For Interfield/Interframe Hybrid Coding Of HDTV Image Sequences", dated Mar. 23, 1992, pp. 465–468.

*Primary Examiner*—Sherrie Hsia

[57] ABSTRACT

A method and system for combining the information from one video field, or multiple video fields in a single, high quality still image. A reference field and auxiliary fields are selected and an orientation map is constructed for the reference field. Motion maps are constructed to model displacement between the reference and auxiliary fields. The auxiliary fields are directionally interpolated using orientation maps. A merge mask is used to mask of certain pixels which should not be used in the final enhanced image. A weighted average is then formed from the reference field pixels which have not been masked off. A final still image is obtained after additional horizontal interpolation. Post-processing might be used to further sharpen the image. The method and system are applicable to both the luminance and chrominance components of the video image. The method and system serve to reduce the noise, as well as the luminance and color aliasing artifacts associated with the reference field, while enhancing its resolution, by utilizing information from the auxiliary fields.

11 Claims, 9 Drawing Sheets

METHOD FOR PROVIDING MOTION-COMPENSATED MULTI-FIELD ENHANCEMENT OF STILL IMAGES FROM VIDEO

FIELD OF THE INVENTION

This invention relates to a method and system for combining the information from multiple video fields into a single, high quality still image.

BACKGROUND OF THE INVENTION

Individual fields from video sources generally exhibit the following shortcomings:

sensor, tape and transmission noise;

luminance aliasing due to insufficiently dense spatial sampling of the optical scene;

chrominance aliasing due to insufficiently dense spatial sampling of particular color components in the optical scene (often occurs with single CCD video cameras which can only sense one color component at each pixel position);

relatively poor resolution.

However, video sources have the advantage that many pictures of the same scene are available, usually with relatively small displacements of the scene elements between consecutive fields. After suitable compensation for motion, these multiple pictures can be combined to produce a still image with less noise. Perhaps more importantly, however, the existence of motion allows for effectively having a denser sampling of the optical scene than is available from any single field. This opens up the possibility for aliasing removal as well as resolution enhancement.

While analog video is considered, many of the following observations also apply to a variety of digital video sources. One observation is that the resolution of the chrominance components is significantly lower than that of the luminance components. Specifically, the horizontal chrominance resolution of an NTSC (National Television System Standard) broadcast video source is about $1/7$ that of the luminance. Also, although the NTSC standard does not limit the vertical resolution of the chrominance components below that of the luminance components, most popular video cameras inherently halve the vertical chrominance resolution, due to their single CCD design. Since the chrominance components carry very little spatial information in comparison to the luminance component, a process might focus resolution enhancement efforts on the luminance channel alone. Moreover, the computational demand of the multi-field enhancement system can be reduced by working with a coarser set of chrominance samples than that used for the luminance component.

A second observation concerning analog video is that the luminance component is often heavily aliased in the vertical direction, but much less so in the horizontal direction. This is to be expected, since the optical bandwidth is roughly the same in both the horizontal and vertical directions, but the vertical sampling density is less than half the horizontal sampling density. Moreover, newer video cameras employ CCD sensors with an increasing number of sensors per row, whereas the number of sensor rows is set by the NTSC standard. Empirical experiments confirm the expectation that high horizontal frequencies experience negligible aliasing, whereas high vertical frequencies are subjected to considerable aliasing. Hence, it is unlikely to be possible to increase the horizontal resolution of the final still image through multi-field processing; however, it should be possible to "unwrap" aliasing components to enhance the vertical resolution and remove the annoying aliasing artifacts ("jaggies") around non-vertical edges.

Hence, what is needed is a method and system for combining the information from multiple video fields into a single, high quality still image.

SUMMARY OF THE INVENTION

A system combines information from multiple video fields into a single high quality still image. One of the fields is selected to be the reference and the remaining fields are identified as auxiliary fields. The system reduces the noise, as well as the luminance and color aliasing artifacts associated with the reference field, while enhancing its resolution, by utilizing information from the auxiliary fields.

An orientation map is constructed for the reference field and is used to directionally interpolate this field up to four times the vertical field resolution.

Motion maps are constructed to model the local displacement between features in the reference field and corresponding features in each of the auxiliary fields. Motion is computed to quarter pixel accuracy in the vertical direction and half pixel accuracy in the horizontal direction, using the directionally interpolated reference field to accomplish the sub-pixel search. The motion maps are used firstly to infer an orientation map for each of the auxiliary fields directly from the reference field's orientation map (note that orientation maps could be computed for each field separately, if the computational demand were not considered excessive) and later to guide incorporation of information from the auxiliary fields into the reference field.

The auxiliary fields are then directionally interpolated to the same resolution as the interpolated reference field, using their inferred orientation maps.

A merge mask is determined for each auxiliary field to mask off pixels which should not be used in the final enhanced still image; the masked off pixels generally correspond to regions where the motion maps fail to correctly model the relationship between the reference and auxiliary fields; such regions might involve uncovered background, for example.

A weighted average is formed from the reference field pixels and the motion-compensated auxiliary field pixels which have not been masked off. The weights associated with this weighted averaging operation are spatially varying and depend upon both the merge masks and the displacements recorded in the motion maps. Unlike conventional field averaging techniques, this approach does not destroy available picture resolution in the process of removing aliasing artifacts.

The final still image is obtained after horizontal interpolation by an additional factor of two (to obtain the correct aspect ratio after the fourfold vertical interpolation described above) and an optional post-processing operations which sharpens the image formed from the weighted averaging process described above. The above processing steps are modified somewhat for the chrominance components to reflect the fact that these components have much less spatial frequency content than the luminance component.

An important property of this image enhancement system is that it can work with any number of video fields at all. If only one field is supplied, the system employs the sophisticated directional interpolation technique mentioned above. If additional fields are available, they are directionally interpolated and merged into the interpolated reference field so as to progressively enhance the spatial frequency content, while reducing noise and other artifacts. In the special case where two fields are available, the system may also be understood as a "de-interlacing" tool.

Other advantages of this invention will become apparent from the following description taken in conjunction with the accompanying drawings which set forth, by way of illustration and example, certain embodiments of this invention. The drawings constitute a part of this specification and include exemplary embodiments, objects and features of the present invention.

DETAILED DESCRIPTION OF THE PREFERRED EMBODIMENT

It should be understood that while certain forms of the invention are illustrated, they are not to be limited to the specific forms or arrangements of parts herein described and shown. It will be apparent to those skilled in the art that various changes may be made without departing from the scope of the invention and the invention is not to be considered limited to what is shown in the drawings and descriptions.

To facilitate the discussion which follows, let $H_F$ and $W_F$ denote the number of rows (height) and columns (width) of each digitized video field. Many video digitizers produce fields with $W_F=640$ columns and $H_F=240$ rows, but this need not be the case. The multi-field processing system directionally interpolates the reference field to a resolution of $H_I=4H_F$ by $W_I=W_F$ (i.e. vertical expansion by a factor of 4) and then enhances the vertical information content by adaptively merging the directionally interpolated, motion compensated and appropriately weighted auxiliary fields into this interpolated reference field. This adaptive merging process also serves to remove aliasing and reduce noise.

It should be noted that these dimensions describe only the luminance component of the video signal. The chrominance components are treated differently. Original chrominance fields each have $H_F$ rows, but only $W_F/4$ columns. The video digitization and decoding operations may produce chrominance components with these resolutions, or else the process may decimate the chrominance components of a collection of video fields which have already been decoded. In this way the process reduces the memory requirements and computational demand associated with the multi-field enhancement operation, without sacrificing actual information. The multi-field processing system directionally interpolates the reference field's chrominance components to a resolution of $H_I/2=2H_F$ by $W_I/4=W_F/4$ (i.e. vertical expansion by a factor of 2) and then adaptively merges the directionally interpolated and motion compensated auxiliary fields' chrominance components into the reference field to reduce chrominance noise and artifacts. Note that the chrominance components from the various fields are merged by simple averaging, after invalid pixels from regions which do not conform to the estimated inter-field motion model have been masked off. This temporal averaging is able to reduce noise and color aliasing artifacts but is not able to enable the spatial frequency content of the image. The luminance components from the various fields, however, are merged using a spatially varying weighted average, whose weights are computed from the estimated inter-field motion so as to remove aliasing while enhancing the spatial frequency content of the image.

The final image produced by the system has $H=H_I=4H_F$, rows by $W=2W_I=2W_F$ columns. It is formed by doubling the horizontal resolution of the luminance component and quadrupling the horizontal resolution and doubling the vertical resolution of the chrominance components produced by the method described above. These operations are required to restore the luminance component to the correct aspect ratio and to obtain a full set of chrominance sample values at every pixel position. In the preferred embodiment of the invention, horizontal doubling of the luminance resolution may be achieved by applying the interpolation filter kernel, $$(-1/8, 5/8, 5/8, -1/8) \tag{1}$$

This kernel has been selected to preserve the horizontal frequency response of the original video signal, while allowing for a multiplication-free implementation. The same interpolation kernel is used to expand the horizontal chrominance resolution by a factor of two, after which the chrominance components are expanded by an additional factor of two in both directions using conventional bilinear interpolation.

Section 2 below discloses a method to estimate location orientations within the reference field, along with an interpolation procedure used to directionally interpolate the reference and auxiliary fields according to the estimated orientation map. Section 1 discloses a method to obtain the motion maps between the reference and auxiliary fields.

Finally, Section 3 discloses methods to build merge masks and merge weighting factors, along with the fast algorithm used to actually merge the reference and auxiliary fields into an enhanced still image.

1 Motion Estimation between Reference and Auxiliary Fields

Figure 1A:
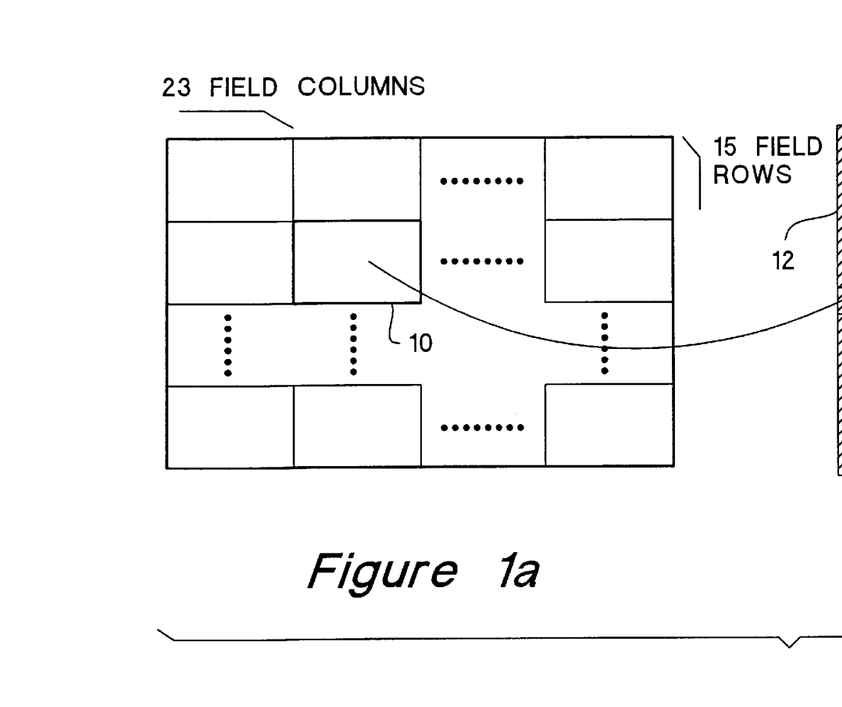
FIG. 1 shows a block structure used for motion estimation and field merging: a) non-overlapping segmentation of reference field; b) overlapping motion blocks surrounding each segmentation block.
Figure 1B:
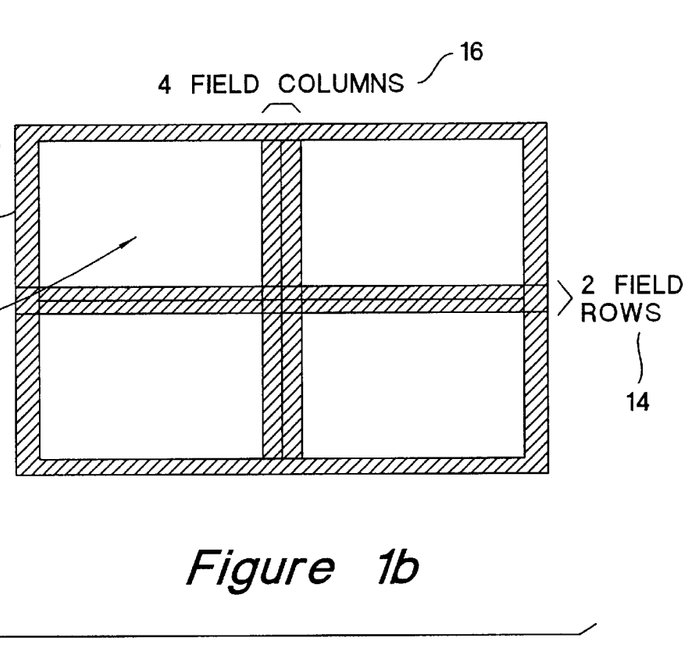

The reference field is first segmented into non-overlapping blocks which have approximately 15 field rows and 23 field columns each in the current implementation. This segmentation is depicted in FIG. 1a. Each of these segmentation blocks 10 is surrounded by a slightly larger motion block 12, as depicted in FIG. 1b. Adjacent motion blocks overlap one another by two fields rows 14 and four fields columns 16 in the current implementation. The motion estimation sub-system is responsible for computing a single motion vector for each motion block, for each auxiliary field. The motion vector is intended to describe the displacement of scene objects within the motion block, between the reference and the relevant auxiliary field. These motion vectors are used to guide the process described in Section 3, whereby interpolated reference and auxiliary fields are merged into a single image. This merging process is performed independently on each motion block, after which the merged motion blocks are stitched together to form the final image. A smooth weighting function is used to average overlapping regions from adjacent motion blocks. The purpose of this section is to describe only the method used to estimate motion vectors for any given motion block.

For each of the auxiliary fields, the system process the motion blocks in lexicographical fashion. Estimation of the motion vector for each of these blocks proceeds in three distinct phases. The first phase attempts to predict the motion vector based on the motion vectors obtained from previously processed, neighboring motion blocks. The prediction strategy is described in Section 1.1. This predicted motion vector is used to bias the efficient and robust coarse motion estimation technique, described in Section 1.2, which estimates motion to full pixel accuracy only. The final refinement to quarter pixel accuracy in the vertical direction and half pixel accuracy in the horizontal direction is performed using a conventional MAD block matching technique. Details are supplied below in Section 1.3.

1.1 Motion Prediction

To facilitate the discussion, let $\underline{v}_{m,n}=(v_{m,n}^x, v_{m,n}^y)$ denote the coarse—i.e. pixel resolution—motion vector for the (m,n)'th motion block, i.e. the n'th motion block in the m'th row of motion blocks associated with the reference field. Since motion vectors are estimated in lexicographical order, the neighboring coarse motion vectors, $\underline{v}_{m,n-1}$, $\underline{v}_{m-1,n-1}$, $\underline{v}_{m-1,n}$ and $\underline{v}_{m-1,n+1}$, have already been estimated and can be used to form an initial prediction or $\underline{\tilde{v}}_{m,n}$. In particular, the motion estimation sub-system sets the predicted vector, $\underline{\tilde{v}}_{m,n}$, to be the arithmetic mean of the three least disparate of these four neighboring motion vectors. For the purpose of this computation, the disparity among any collection of three motion vectors, $\underline{v}_1$, $\underline{v}_2$ and $\underline{v}_e$, is defined as $$\mathcal{D}(\underline{v}_1, \underline{v}_2, \underline{v}_3) \triangleq \sum_{i=1}^{3}\left(\left|v_i^x - \frac{1}{3}\sum_{j=1}^{3}v_j^x\right| + \left|v_i^y - \frac{1}{3}\sum_{j=1}^{3}v_j^y\right|\right),$$

i.e. the sum of the $L^1$ distances between each of the vectors and their arithmetic mean.

One reason for forming this prediction, $\underline{\tilde{v}}_{m,n}$, is not to reduce the full motion vector search time, but rather to encourage the development of smooth motion maps. In regions of the scene which contain little information from which to estimate motion, it is preferred to adopt the predicted vectors whenever this is reasonable. Otherwise, the "random" motion vectors usually produced by block motion estimation algorithms in these regions can cause annoying visual artifacts when attempts are made to merge the reference and auxiliary fields into a single still image.

1.2 Coarse Motion Estimation

In general, the process produces a coarse—i.e. full pixel accuracy—estimate of the motion, $\underline{v}_{m,n}$, between the reference field and a given auxiliary field, for the (m,n)'th motion block. Moreover, we would like to bias the estimate towards the predicted vector, $\underline{\tilde{v}}_{m,n}$, whenever this is consistent with the features found in the two fields. The coarse motion estimation sub-system performs a full search which, in one embodiment of the system, involves a search range of $|v_{m,n}^x| \leq 10$ field columns and $|v_{m,n}^y| \leq 5$ field rows. For each vector, $\underline{v}$, in this range, the process computes an objective function, $O(\underline{v})$, which will be discussed below. To facilitate the discussion, let $O_{min}$ denote the minimum value attained by $O(\underline{v})$ over the search range let V denote the set of all motion vectors, $\underline{v}$, such that $O(\underline{v}) \leq O_{min}+T_m$, where $T_m$ is a pre-defined threshold. The final coarse motion estimate, $\underline{v}_{m,n}$, is taken to be the vector, $\underline{v} \in V$, which is closest to the predicted vector, $\underline{\tilde{v}}_{m,n}$. Here, the $L^1$ distance metric is used, so that the distance between $\underline{v}$ and $\underline{\tilde{v}}_{m,n}$ is $|v^x - \tilde{v}_{m,n}^x| + |v^y - \tilde{v}_{m,n}^y|$.

The actual objective function, $O(\underline{v})$, used for coarse motion estimation, is disclosed as follows. Rather than using the computationally intensive Maximum Absolute Distance (MAD) objective, the process constructs the objective function from a novel 2 bit per pixel representation of the reference and auxiliary fields. Specifically, the luminance components of the reference and auxiliary fields are first pre-conditioned with a spatial bandpass filter, as described in Section 1.2.1; a two bit representation of each bandpass filtered luminance sample is formed by a simple thresholding technique, described in Section 1.2.2; and then the objective function is evaluated by a combination of "exclusive or" (XOR) and counting operations which are applied to the two bit pixel representations, as described in Section 1.2.3.

1.2.1 Bandpass Filtering for Coarse Motion Estimation

A simple bandpass filter is constructed, in one embodiment, by taking the difference of two moving window lowpass filters. Specifically, let y[i,j] denote the luminance sample from any given field at row i and column j. The bandpass filtered pixel, $\bar{y}[i,j]$, is computed according to $$\bar{y}[i, j] \triangleq \frac{1}{L^x L^y}\left(\sum_{p=1-L^y/2}^{L^y/2} \sum_{q=1-L^x/2}^{L^x/2} y[i+p, j+q]\right) - \frac{1}{W^x W^y}\left(\sum_{p=1-W^y/2}^{W^y/2} \sum_{q=1-W^x/2}^{W^x/2} y[i+p, j+q]\right).$$

Here, $L^x$ and $L^y$ and the width and height of the "local-scale" moving average window, while $W^x$ and $W^y$ are the width and height of the "wide-scale" moving average window. The scaling operations may be reduced to shift operations by ensuring that each of these four dimensions is a power of 2, in which case the entire bandpass filtering operation may be implemented with four additions, four subtractions and two shifts per pixel. In a particular implementation, the dimensions, $L^x=L^y=4$, $W^x=32$ and $W^y=16$ were found to optimize the robustness of the overall motion estimation scheme. It is worth noting that this bandpass filter operation densitizes the motion estimator to inter-field illumination variations, as well as to high frequency aliasing artifacts in the individual fields. At the same time it produces pixels which have zero mean—a key requirement for the generation of useful two bit per pixel representations according to the method described in the following section.

1.2.2 Two Bit Pixel Representation for Coarse Motion Estimation

After bandpass filtering, each filtered sample, $\bar{y}[i,j]$, is assigned a two bit representation in the preferred embodiment of the invention, where this representation is based on a parameter, $T_b$. The first bit is set to 1 if $\bar{y}[i,j] > T_b$ and 0 otherwise, while the second bit is set to 1 if $\bar{y}[i,j]\pi < -T_b$ and 0 otherwise. This two bit representation entails some redundancy in that it quantizes $\bar{y}[i,j]$ into only three different regimes. The representation has the following important property, however. If $Q(\bar{y}_1,\bar{y}_2)$ represents the total number of 1 bits in the two bit result obtained by taking the exclusive or of corresponding bits in the two bit representations associated $\bar{y}_1$ and $\bar{y}_2$, then it is easy to verify that $Q(\bar{y}_1,\bar{y}_2)$ satisfies the following relationship.

$$Q(\bar{y}_1, \bar{y}_2) = \begin{cases} 0, & \bar{y}_1 > T_b \text{ and } \bar{y}_2 > T_b \\ 0, & -T_b \leq \bar{y}_1 \leq T_b \text{ and } -T_b \leq \bar{y}_2 \leq T_b \\ 0, & \bar{y}_1 < -T_b \text{ and } \bar{y}_2 < -T_b \\ 1, & \bar{y}_1 > T_b \text{ and } -T_b \leq \bar{y}_2 \leq T_b \\ 1, & \bar{y}_2 > T_b \text{ and } -T_b \leq \bar{y}_1 \leq T_b \\ 1, & \bar{y}_1 < -T_b \text{ and } -T_b \leq \bar{y}_2 \leq T_b \\ 1, & \bar{y}_2 < -T_b \text{ and } -T_b \leq \bar{y}_1 \leq T_b \\ 2, & \bar{y}_1 > T_b \text{ and } \bar{y}_2 < -T_b \\ 2, & \bar{y}_2 > T_b \text{ and } \bar{y}_1 < -T_b \end{cases}$$

Thus, $Q(\bar{y}_1,\bar{y}_2)$ may be interpreted as a measure of the distance between $\bar{y}_1$ and $\bar{y}_2$.

1.2.3 The Coarse Motion Estimation Objective Function

The objective function, $O(\underline{v})$, is constructed by taking the sum of the two bit distance metric, $Q(\bar{y}_r[i,j],\bar{y}_a[i+v^y,j+v^x])$, over all pixels, $(i,j)$, lying within a coarse matching block; this coarse matching block is generally larger than the motion block itself. Here $\bar{y}_r[i,j]$ is the bandpass filtered sample at row i and column j of the reference field, while $\bar{y}_a[i,j]$ is the bandpass filtered sample at row i and column j of the auxiliary field. In our implementation the coarse matching block consists of 20 field rows by 32 field columns, surrounding the motion block of interest.

1.3 Refinement to Sub-Pixel Accuracy

In one embodiment of the invention, a conventional MAD (Mean Absolute Difference) search is performed, with a search range of one field column and half a field row around the vector returned by the coarse motion estimation subsystem, searching in increments of half the field column separation and a quarter of the field row separation. Only the reference field need be interpolated to the higher resolution (four times vertical and twice horizontal resolution) in order achieve this sub-pixel accuracy search. The auxiliary fields are pre-conditioned by applying a five tap vertical low-pass filter with kernel, (1/16,4/16,6/16,4/16,1/16), prior to performing the motion refinement search. This low-pass filtering reduces sensitivity to vertical aliasing.

Directional Interpolation of each Field 2.1 Orientation Estimation

The object of orientation estimation is to identify the direction of image edges in the neighborhood of any given pixel so the intra-field vertical interpolation operation described in Section 2.2 below can be careful to interpolate along rather than across an edge. In addition to correct identification of edge orientation, one key requirement for the estimator is that the resulting orientation map be as smooth as possible. It is preferred that the orientation map not fluctuate wildly in textured regions or in smooth regions which lie near to actual image edges, because such fluctuations might manifest themselves as visually disturbing artifacts after interpolation. It is therefore important to control the numerical complexity of the estimation technique.

Figure 2:
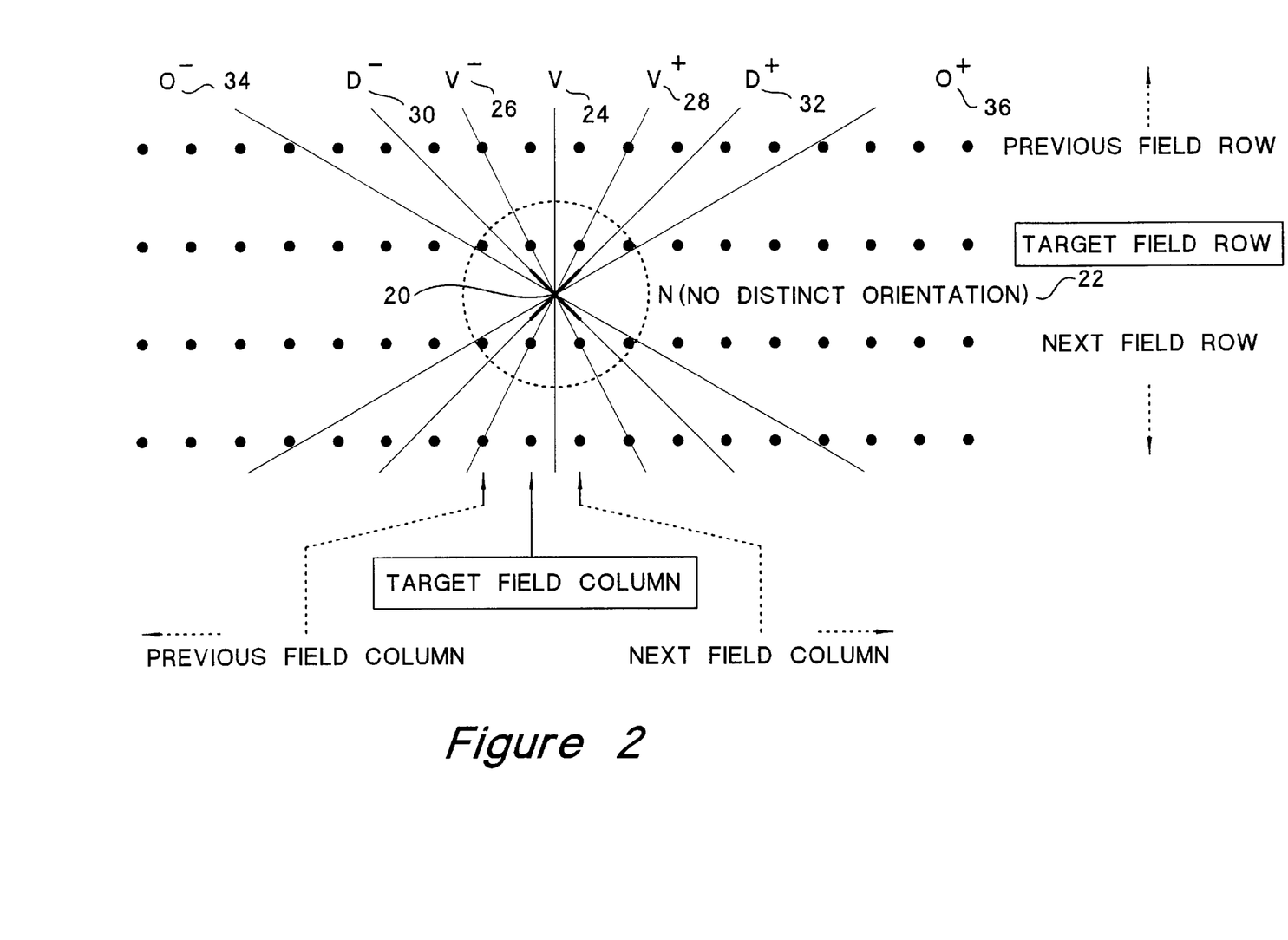
FIG. 2 shows the eight orientation classes and their relationship to the target luminance pixel with which they are associated.

The orientation estimation sub-system works with the luminance component of the reference field. For each "target" luminance pixel in this field, an orientation class is selected. The orientation class associated with a given target row and target column is to be interpreted as the dominant feature orientation observed in a neighborhood whose centroid lies between the target and next field rows and between the target and next field columns. This centroid is marked with a cross pattern 20 in FIG. 2. The figure also illustrates the set of eight orientation classes which may be associated with each target luminance pixel; they are:

22 N: No distinct orientation.

24 V: Distinct orientational feature at 90° (vertical).

26 V$^-$: Distinct orientational feature at 63° (near vertical) from top-left to bottom-right.

28 V$^+$: Distinct orientational feature at 63° (near vertical) from top-right to bottom-left.

30 D$^-$: Distinct orientational feature at 45° (diagonal) from top-left to bottom-right.

32 D$^+$: Distinct orientational feature at 45° (diagonal) from top-right to bottom-left.

30 O$^-$: Distinct orientational feature at 27° (oblique) from top-left to bottom-right.

32 O$^+$: Distinct orientational feature at 27° (oblique) from top-right to bottom-left.

The orientation class associations for each luminance pixel in the reference field constitute the orientation map.

Figure 3:
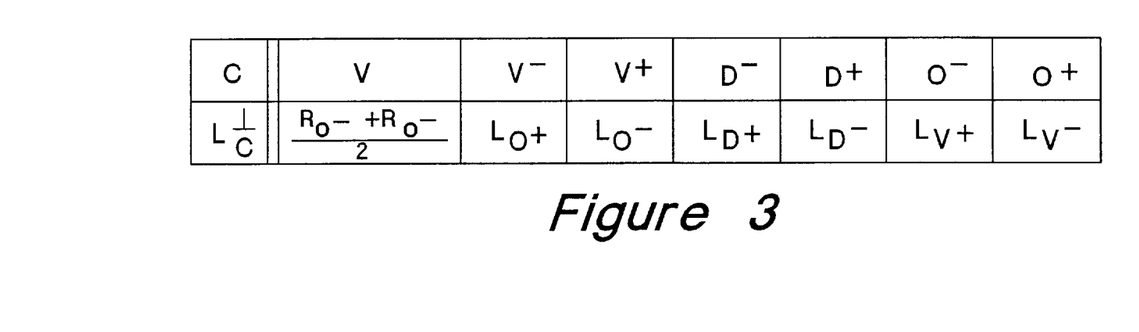
FIG. 3 shows a table of orthogonal likelihood values, $L_c^\perp$, for each of the directed orientation classes, C.

The estimation strategy consists of a number of elements, whose details are discussed separately below. Essentially, a numerical value, $L_C$, is assigned to each of the distinctly oriented classes, $C \in \{V,V^-,V^+,D^-,D^+,O^-,O^+\}$, which is to be interpreted as the likelihood that a local orientation feature exists with the corresponding orientation. The estimated orientation class is tentatively set to the distinct orientation class, C, which has the maximum value, $L_C$. The likelihood value, $L_C$, for the selected class is then compared with an orthogonal likelihood value, $L_C^\perp$, which represents the likelihood associated with the orthogonal direction. If the difference between $L_C$ and $L_C^\perp$ is less than a pre-determined threshold, the orientation class is set to N, i.e. no distinct orientation. The orthogonal likelihood value is obtained from the table of FIG. 3. The orientation may obtained in the manner described above, is subjected to a final morphological smoothing operation to minimize the number of disturbing artifacts produced during directional interpolation. This smoothing operation is described in Section 2.1.3.

To compute the likelihood values, $L_C$, for each directed orientation class, C, the luminance pixels are processed first, using a directional low-pass filter which smooths in a direction which is approximately perpendicular to that of C. $L_C$ is then based on a Total Variation (TV) metric, computed along a trajectory which is parallel to the orientation of C; the larger the variation, the smaller the likelihood value. The seven directional filtering operations are described in Section 2.1.1, while the TV metric is described in Section 2.1.2 below.

2.1.1 Oriented Pre-Filtering of the Luminance Field

The reference field's luminance component is first pre-conditioned by applying a vertical low-pass filter with the three tap kernel, $$(1/4, 1/2, 1/4).$$

One purpose of this pre-conditioning filter is to reduce the influence of vertical aliasing artifacts which can adversely affect the estimation sub-system.

Figure 4:
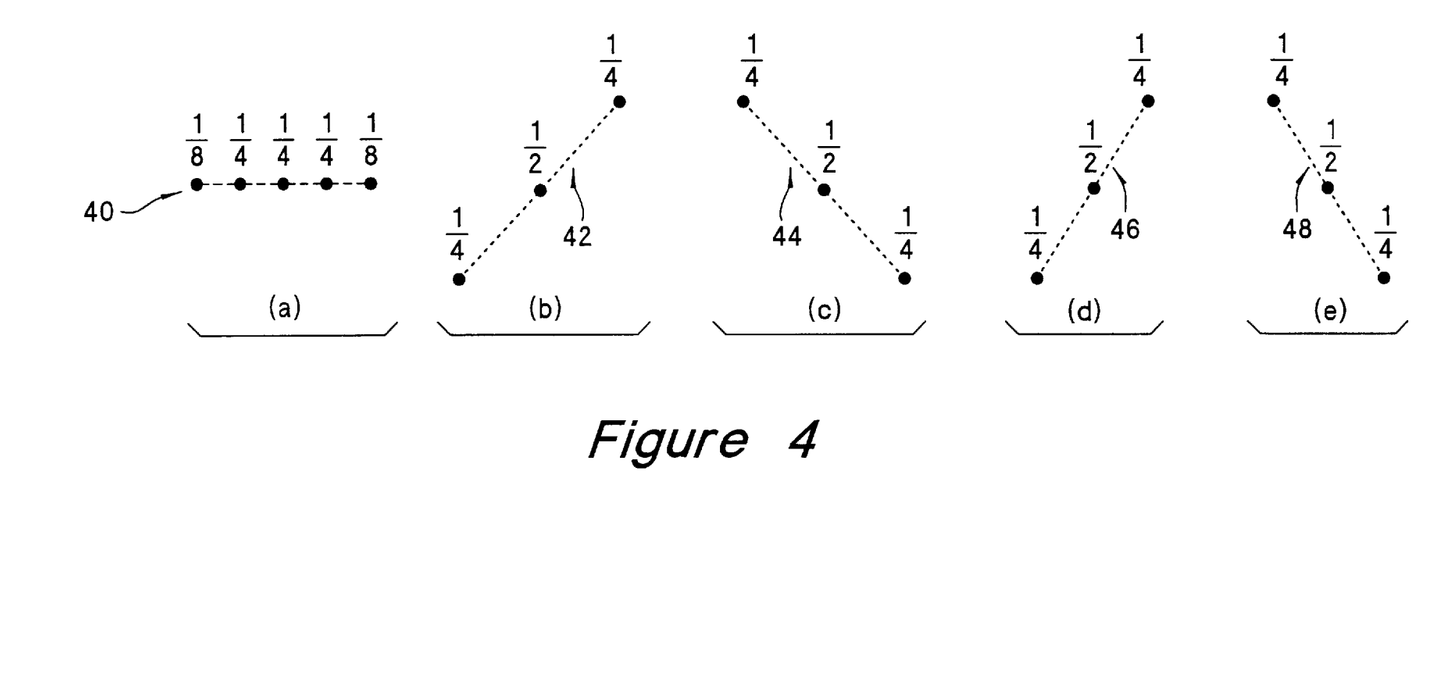
FIG. 4 shows directional low-pass filters applied to the pre-conditioned reference field luminance component to prepare the calculation of the orientation class likelihood values: a) $L_V$, $L_{V-}$ and $L_{V+}$; b) $D^-$; c) $D^+$; d) $O^-$; and e) $O^+$.

To prepare the pre-conditioned luminance field for calculation of vertical likelihood values, $L_V$, and near vertical likelihood values, $L_{V-}$ and $L_{V+}$, the horizontal low-pass filter whose five taps are illustrated in FIG. 4a is applied.

To prepare the pre-conditioned luminance field for calculation of the diagonal likelihood values, $L_{D-}$, the diagonal low-pass filter whose three taps 42 are illustrated in FIG. 4b is applied. The complementary filter, whose three taps 44 are illustrated in FIG. 4c, is used to prepare for calculation of the complementary diagonal likelihood values, $L_{D+}$.

Finally, to prepare the pre-conditioned luminance field for calculation of the oblique likelihood values, $L_{O-}$ and $L_{O+}$, we apply the near vertical low-pass filters 46,48 illustrated in FIGS. 4d and 4e, respectively.

2.1.2 The Directional TV Metric

For each directed orientation class, C, the likelihood values, $L_C$, are found by negative a set of corresponding "unlikelihood" values, $U_C$. The unlikelihood values for each directed orientation class are computed by applying an appropriate "total variation" measure to the reference field's luminance component, after pre-conditioning and appropriate directional pre-filtering, as described in Section 2.1.1 above.

Figure 5:
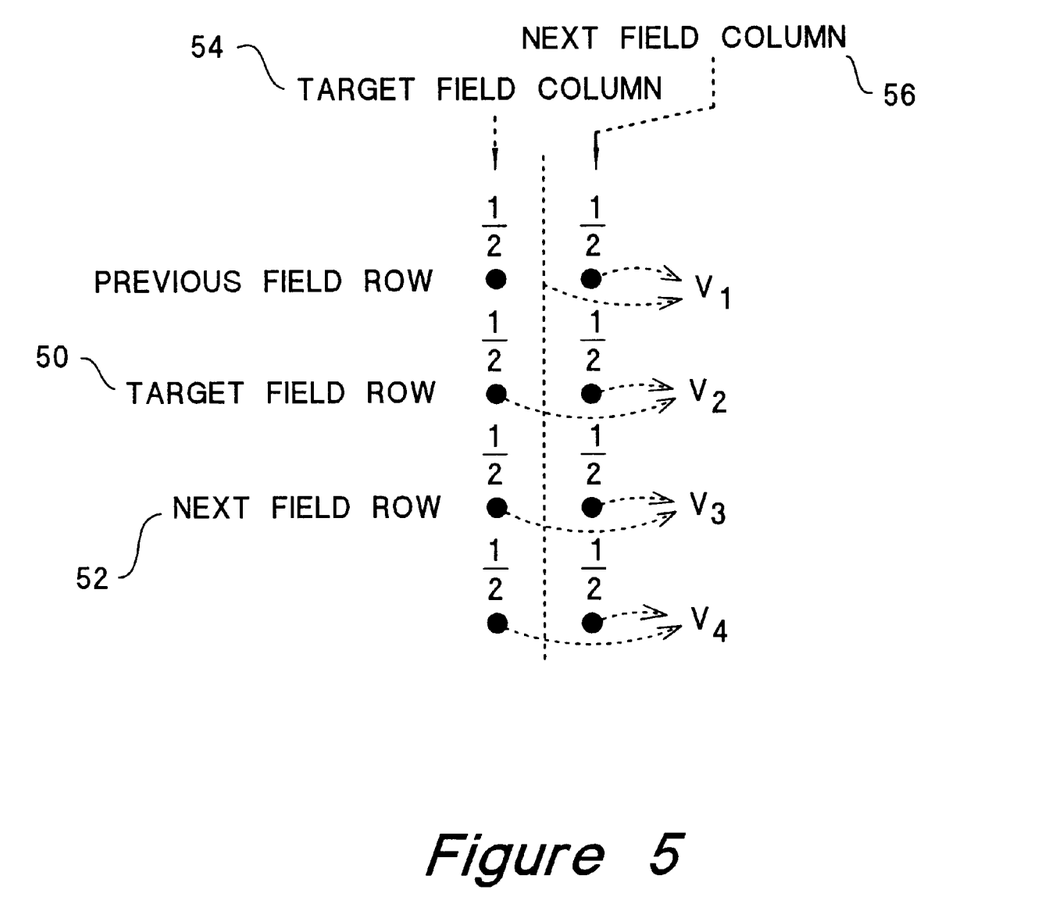
FIG. 5 shows intermediate linear combinations, $v_1$, $v_2$, $v_3$ and $v_4$, of horizontally pre-filtered luminance pixels sued to form the vertical unlikelihood value, $U_V$.

The vertical unlikelihood value is calculated from $$U_V \triangleq 6 \cdot |v_2 - v_3| + 2 \cdot |v_1 - v_2| + 2 \cdot |v_3 - v_4|,$$

where $v_1, v, v_3$ and $v_4$ are linear combinations of pixels from the pre-conditioned and horizontally pre-filtered luminance field; these linear combinations are depicted in FIG. 5. The centroid of this calculation lies halfway between the target 50 and next field row 52 and halfway between the target 54 and next field column 56, which is in agreement with FIG. 2.

Figure 6:
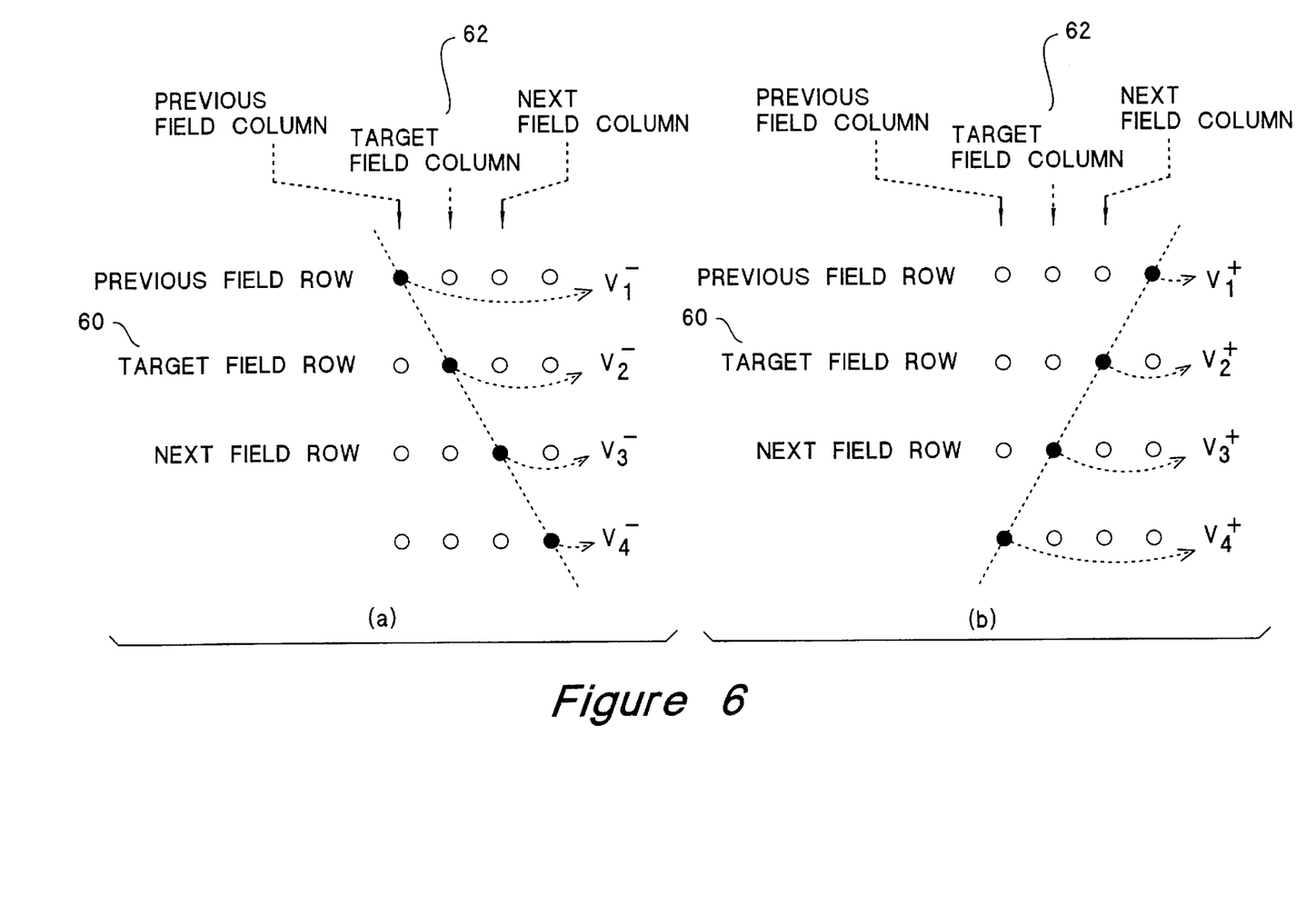
FIG. 6 shows horizontally pre-filtered luminance pixels used to form the near vertical unlikelihood values; a) $U_{V-}$ and b) $U_{V+}$.

The near vertical unlikelihood values are calculated from $$U_{V-} \triangleq 4 \cdot |v_2^- - v_3^-| + 3 \cdot |v_1^- - v_2^-| + 3 \cdot |v_3^- - v_4^-|$$

and $$U_{V+} \triangleq 4 \cdot |v_2^+ - v_3^+| + 3 \cdot |v_1^+ - v_2^+| + 3 \cdot |v_3^+ - v_4^+|,$$

where the $v_i^\pm$ terms represent pixel values from the pre-conditioned and horizontally pre-filtered luminance field; the relevant pixels are depicted in FIGS. 6a and 6b. Again, the centroid of these calculations lies half and field row below and half a field column to the right of the target field row 60 and column 62, as required for consistency with the definition of the orientation classes.

Figure 7:
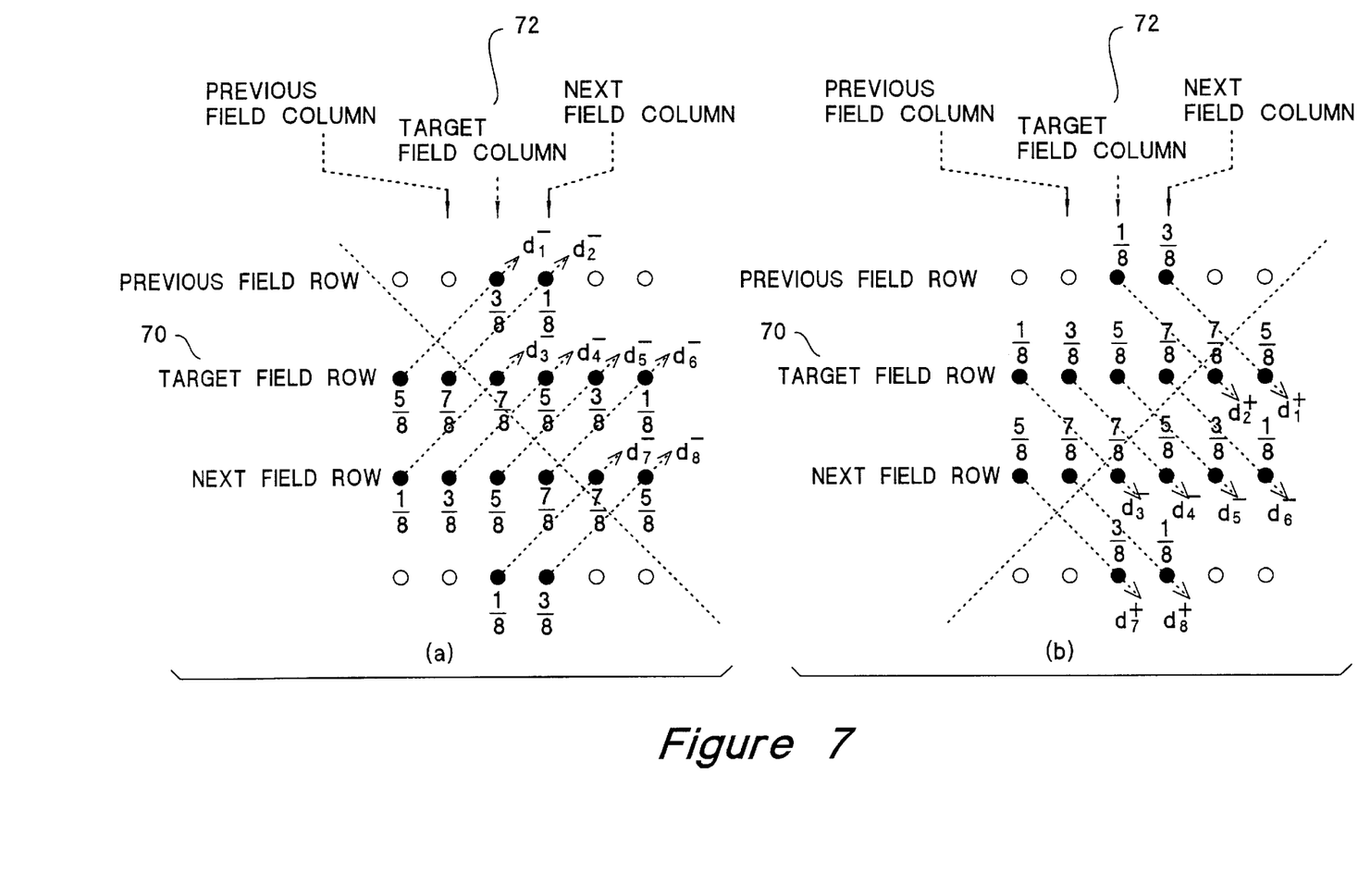
FIG. 7 shows intermediate linear combinations, $d_i^\pm$, of diagonally pre-filtered luminance pixels, used to form the diagonal unlikelihood values; a) $U_{D-}$ and b) $U_{D+}$.

The diagonal unlikelihood values are calculated from $$U_{D-} \triangleq |d_1^- - d_3^-| + 2 \cdot |d_2^- - d_4^-| + 2 \cdot |d_3^- - d_5^-| + 2 \cdot |d_4^- - d_6^-| + 2 \cdot |d_5^- - d_7^-| + |d_6^- - d_8^-|$$

and $$U_{D+} \triangleq |d_1^+ - d_3^+| + 2 \cdot |d_2^+ - d_4^+| + 2 \cdot |d_3^+ - d_5^+| + 2 \cdot |d_4^+ - d_6^+| + 2 \cdot |d_5^+ - d_7^+| + |d_6^+ - d_8^+|$$

where the $d_i^\pm$ terms each represents a linear combination of two pixel values from the pre-conditioned and diagonally pre-filtered luminance field. The $d_i^-$ terms are formed after applying the diagonal pre-filter shown in FIG. 4b, while the $d_i^+$ terms are formed after applying the diagonal pre-filter shown in FIG. 4c. The pixels and weights used to form the $d_i^-$ and $d_i^+$ terms are illustrated in FIGS. 7a and 7b, respectively. Notice that the centroid of these calculations again lies half a field row below and half a field column to the right of the target field row 70 and column 72, as required for consistency with the definition of the orientation classes.

Figure 8A:
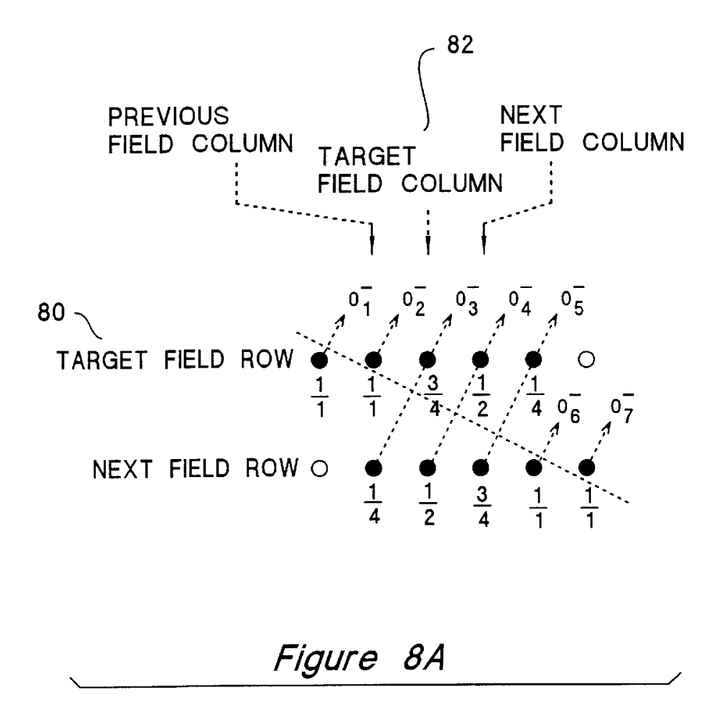
FIG. 8 shows intermediate linear combinations, $o_i^\pm$, of near vertically pre-filtered luminance pixels, used to form the oblique unlikelihood values: a) $U_{O-}$ and b) $U_{O+}$.
Figure 8B:
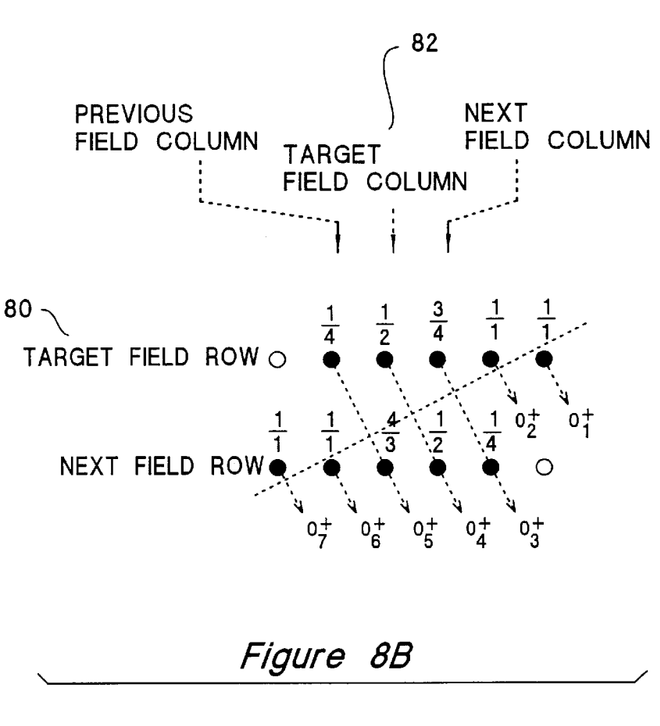

Finally, the oblique unlikelihood values are calculated from $$U_{O-} \triangleq 2 \cdot |o_1^- - o_3^-| + 2 \cdot |o_2^- - o_4^-| + 2 \cdot |o_3^- - o_5^-| + 2 \cdot |o_4^- - o_6^-| + 2 \cdot |o_5^- - o_7^-|$$

and $$U_{O-} \triangleq 2 \cdot |o_1^+ - o_3^+| + 2 \cdot |o_2^+ - o_4^+| + 2 \cdot |o_3^+ - o_5^+| + 2 \cdot |o_4^+ - o_6^+| + 2 \cdot |o_5^+ - o_7^+|$$

where the $o_i^\pm$ terms each represents a linear combination of two pixel values from the pre-conditioned and near vertically pre-filtered luminance field. The $o_i^-$ terms are formed after applying the near vertical pre-filter shown in FIG. 4d, while the $o_i^+$ terms are formed after applying the near vertical pre-filter shown in FIG. 4e. The pixels and weights used to form the $o_i^-$ and $o_i^+$ terms are illustrated in FIGS. 8a and ib, respectively. Notice that the centroid of these calculations again lies half a field row below and half a field column to the right of the target field row 80 and column 82, as required for consistency with the definition of the orientation classes.

2.1.3 Morphological Smoothing of the Orientation Map

Figure 9:
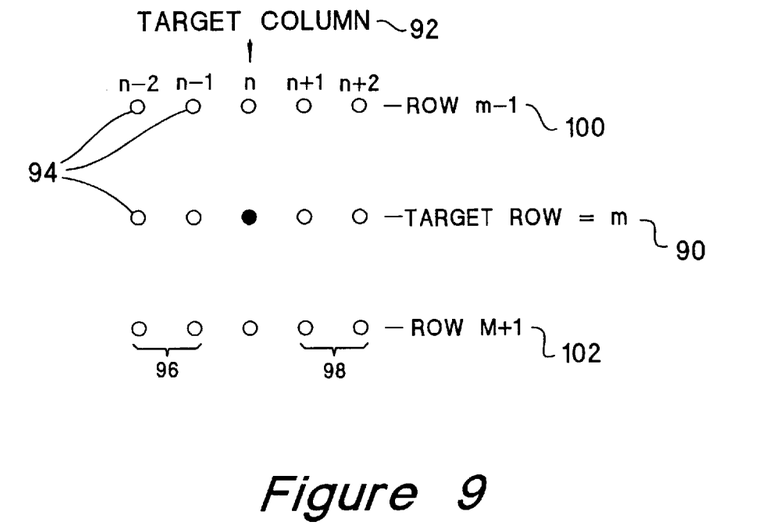
FIG. 9 shows neighboring class values used to form the smoothed orientation class, $\overline{C}_{m,n}$, associated with the target pixel at row m and column n.

The morphological smoothing operator takes, as its input, the initial classification of each pixel in the reference field into one of the orientation classes, V, V$^-$, V$^+$, D$^-$, D$^+$, O$^-$ or O$^+$, and produces a new classification which generally has less inter-class transitions. To facilitate the discussion, let $C_{m,n}$ denote the initial orientation classification associated with target field row m 90 and target field column n 92. The smoothing operator generates a potentially different classification, $\overline{C}_{m,n}$, by considering $C_{m,n}$ together with the 14 neighbors 94 depicted in FIG. 9. The smoothing policy is that the value of $\overline{C}_{m,n}$ should be identical to $C_{m,n}$, unless either a majority of the 6 neighbors 96 lying to the left of the target pixel and a majority of the 6 neighbors 98 lying the right of the target pixel all have the same classification, C, or a majority of 5 neighbors 100 lying above the target pixel and a majority of the 5 neighbors 102 lying below the target pixel all have the same classification, C. In either of these two cases, the value of $\overline{C}_{m,n}$ is set to C.

2.2 Interpolation

This section describes the directional interpolation strategy which is used to quadruple the number of luminance rows and double the number of chrominance rows. To facilitate the ensuing discussion, let $Y_{4m,n}$ in FIG. 10 denote the luminance pixel at field row m and field column n. The purpose of luminance interpolation is to derive three new luminance rows, $Y_{4m+1,n}$, $Y_{4m+2,n}$ and $Y_{4m+3,n}$, between every pair of original luminance rows, $Y_{4m,n}$ 120 an $Y_{4m+4,n}$ 122. Similarly, the purpose of chrominance interpolation is to derive one new chrominance row, $C_{2m+1,k}$, between every pair of original chrominance rows, $C_{2m,k}$ and $C_{m+2,k}$. Only one of the chrominance components is explicitly referred to, with the understanding that both chrominance components should be processed identically. Also, we use the index, k rather than n, to denote chrominance columns, since the horizontal chrominance resolution is only one quarter of the horizontal luminance resolution.

Figure 10:
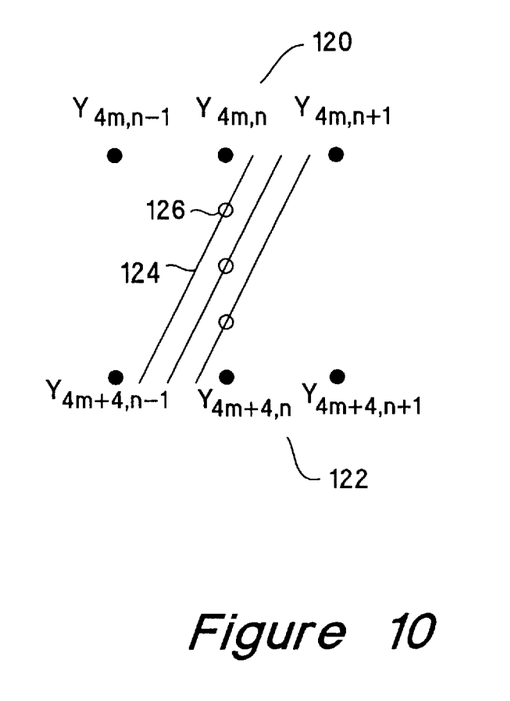
FIG. 10 shows an example of the linear directional interpolation strategy used to recover the three missing luminance samples, $Y_{4m+1,n}$, $Y_{4m+2,n}$ and $Y_{4m+3,n}$ from neighboring original field rows. In this example, the orientation class is $C_{m,n}=V^+$.

As described above, $C_{m,n}$ refers to the local orientation class associated with a region whose centroid lies between field rows m and m+1. The missing luminance samples, $Y_{4m+1,n}$, $Y_{4m+2,n}$ and $Y_{4m+3,n}$, are linearly interpolated based on a line 124 drawn through the missing sample location 126 with the orientation, $C_{m,n}$. FIG. 10 illustrates this process for a near-vertical orientation class of $C_{m,n}=V^+$. Note that the original field rows, $Y_{4m,n}$ 120 and $Y_{4m+4,n}$ 122, must often be horizontally interpolated to find sample values on the end-points 120 of the oriented interpolation lines. In one embodiment, the interpolation filter of equation (1) is used to minimize loss of spatial frequency content during this interpolation process. The non-directed orientation class, N, defaults to the same vertical interpolation strategy as the V class.

Chrominance components are treated similarly. Specifically, the missing chrominance sample, $C_{2m+1,k}$, is linearly interpolated based on a line drawn through the missing sample location with the orientation, $C_{m,2k}$. Again, chrominance samples from the original field rows, $C_{2m,k}$ and $C_{2m+2,k}$, must often be horizontally interpolated to find sample values on the end-points of the oriented interpolation lines.

3 Adaptive, Non-Stationary Merging of Interpolated Fields

In this section the method used to merge spatially interpolated pixels from the auxiliary fields into the reference field to produce a high quality still image is described. As mentioned in Section 1, the merging operation is performed independently on each of the overlapping motion blocks illustrated in FIG. 1. The image is stitched together from these overlapping blocks using a smooth transition function within the overlapping regions. The discussion which follows considers the operations used to merge a single motion block; for simplicity, these operations will be described as though this motion block occupied the entire reference field.

The merging process is guided by a single sub-pixel accurate motion vector for each of the auxiliary fields. The first step involves generation of a merge mask for each auxiliary field, to identify the regions in which this motion vector may be considered to describe scene motion between the reference field and the relevant auxiliary field. Merge mask generation is discussed in Section 3.1 below. The next step is to assign weights to each spatially interpolated pixel in the reference and auxiliary fields, identifying the contribution that each will make to the merged image. This step is discussed in Section 3.2 below. Finally, the weighted average of pixels from the various fields is formed using the fast technique described in Section 3.3 below.

3.1 Generation of Merge Masks

For any given auxiliary field, the general objective of the merge mask generation sub-system is to determine a binary mask value for each pixel in the original reference field, not the interpolated reference field. The mask value for a particular pixel, identifies whether or not the motion vector associated with the given auxiliary field correctly describes scene motion between the reference and auxiliary fields in the vicinity of that pixel. Our basic approach for generating these masks involves computing a directionally sensitive weighted average of neighboring pixels in the reference field and corresponding motion compensated pixels in the auxiliary field and comparing these averages. One key to the success of this method is the directional sensitivity of the local pixel averages.

To facilitate the ensuing discussion, let $y_r[i,j]$ denote the luminance sample at row i and column j in the reference field. For convenience, let $y_a[i,j]$ denote the corresponding pixel in the auxiliary field, after compensating for the estimated motion vector. Note that motion compensation may involve sub-pixel interpolation, since our motion vectors are estimated to sub-pixel accuracy. If the motion vector correctly describes motion in the vicinity of pixel (i,j), it might be expected that neighborhood averages around $y_r[i,j]$ and $y_a[i,j]$ would yield similar results. One concern is with image edges, where the success of subsequent field merging depends critically on motion vector accuracy in the direction perpendicular to the edge orientation. To address this concern, the orientation map, discussed in Section 2.1 is used. Only in the special case when the orientation class for pixel (i,j) is N, i.e. no distinct direction, does the process use a non-directional weighted average, whose weights are formed from the tensor product of the seven tap horizontal kernel, $$(1/2,1,1,1,1,1,1/2)$$

and the five tap vertical kernel, $$(1/2,1,1,1,1/2)$$

in one particular embodiment of the invention. In this case, if the weighted averages formed around $y_r[i,j]$ and $y_a[i,j]$ differ by more than a prescribed threshold, the merge mask, $m_{ij}$ is set to 0, indicating that the motion model should not be considered valid in this region.

For all other orientation classes, the reference and auxiliary fields are first filtered with the three tap horizontal low-pass kernel, $$(1/4,1/2,1/4),$$

and then four one-dimensional weighted averages, $\rho[i,j]$, $\alpha_1[i,j]$, $\alpha_2[i,j]$ and $\alpha_3[i,j]$ are computed. Each of these weighted averages is taken along a line oriented in the direction identified by the orientation class for pixel (i,j), using the weights, $$(1/2,1,1,1,1/2).$$

The oriented line used to form $\rho[i,j]$ is centered about pixel (i,j) in the reference field. Similarly, the line used to form $\alpha_2[i,j]$ is centered about pixel (i,j) in the auxiliary field. The lines for $\alpha_1[i,j]$ and $\alpha_2[i,j]$ have centers which fall on either side of pixel (i,j) in the auxiliary field, displaced by approximately half a field row or one field column, as appropriate, in the orthogonal direction to that identified by the orientation class. Thus, in a region whose orientation class is uniformly vertical, the result would be $\alpha_1[i,j]=\alpha_2[i,j-1]=\alpha_3[i,j-2]$. On the other hand, in a region whose orientation class is uniformly oblique, $O^-$ or $O^+$, the horizontal average, $\alpha_1[i,j]$ should approximately equal the arithmetic mean of $\alpha_2[i,j]$ and $\alpha_2[i,j-1]$. From these directional averages, three absolute differences are formed, $$\delta_k[i,j] \triangleq |\rho[i,j]-\alpha_k[i,j]|, \; k=1,2,3.$$

If $\delta_2[i,j]$ exceeds a pre-determined threshold, it is concluded that the motion vector does not describe scene motion in the vicinity of pixel (i,j) and $m_{i,j}$ is set to 0 accordingly. Otherwise, it is concluded that the motion vector is approximately accurate, but the process must still check to see if it is sufficiently accurate for field merging to improve the quality of an edge feature. Reasoning that a small motion error would generally cause one, but not both of $\delta_1[i,j]$ and $\delta_2[i,j]$ to be smaller than $\delta_2[i,j]$, the process tests for this condition, setting $m_{ij}$ to 0 whenever it is found to be true.

3.2 Generation of Spatial Weighting Factors

The merging sub-system forms a weighted average between the directionally interpolated pixels from each field. This section describes the methodology used to determine relevant weights. The chrominance and luminance components are treated in a fundamentally different way, since most of the spatial information is carried only in the luminance channel. All chrominance samples in the reference field are assigned a weight of 1, while chrominance samples from the auxiliary fields are assigned weights of either 1 or 0, depending only on the value of the merge mask for the relevant auxiliary field. In this way, the chrominance components are simply averaged across all fields, except in regions where the motion vectors do not reflect the underlying scene motion. This has the effect of substantially reducing chrominance noise. Moreover, the fact that most scenes contain at least one inter-field motion means that field averaging of the chrominance components tends to cancel color aliasing artifacts, which arise from the harmonic beating of scene features with the color mosaic used in single CCD video cameras.

The same approach could be adopted for merging the luminance components as well; but limitations might exist with respect to enhancing spatial frequency content. Although, the directional spatial interpolation technique is able to enhance spatial frequency content of oriented edge features, textured regions are entirely dependent upon the information from multiple fields for resolution enhancement. In the limit as the number of available fields becomes very large, simple averaging of the interpolated fields has the effect of subjecting the original spatial frequencies in the scene to a low pass filter whose impulse response is identical to the spatial interpolation kernel. If an "ideal" sinc interpolator is used to vertically interpolate the missing rows in each field, the result is an image which has no vertical frequency content whatsoever beyond the Nyquist limit associated with a single field. In the example embodiment of the invention, linear interpolation is used to interpolate the missing field rows prior to merging; and the averaging process does tend to eliminate aliasing artifacts. In order to preserve high spatial frequencies while still removing aliasing and reducing noise in the luminance components, a space varying weighting function can be adopted. Specifically, each luminance sample in any given auxiliary field is assigned a weight of 2 if it corresponds to an original pixel from that field, 1 if it is located within one interpolated row (i.e. one quarter of a field row) from an original pixel, and 0 otherwise. If the relevant merge mask is zero, then the process sets the weight to 0 regardless of the distance between the sample and an original field sample. The reference field luminance samples are weighted in the same manner, except that all samples are assigned a weight of at least 1, in order to provide that at least one non-zero weight is available for every sample in the merged image. This weighting policy has the effect of subjecting vertical frequencies to a much less severe lowpass filter than simple averaging with uniform weights.

3.3 Fast Method for Implementing the Weighted Average

This section describes an efficient method used to implement the weighted averaging of interpolated sample values from the reference and auxiliary fields. The same technique can be used for both luminance and chrominance samples. To facilitate the discussion, let $v_1, v_2, \ldots, v_F$ denote the sample values to be merged from each of F fields to form a single luminance or chrominance sample in the final image. Also, let $w_1, w_2, \ldots, w_F$ denote the corresponding weighting values, which take on values of 0, 1 or 2 according to the discussion in Section 3.2. The desired weighted average may be calculated as $$v = \frac{\sum_{f=1}^{F} v_f \cdot w_f}{\sum_{f=1}^{F} w_f}.$$

This expression involves a costly division operation. To resolve this difficulty, in one embodiment of the invention, the process constructs a single 16 bit word, $\hat{v}_f$, for each sample. The least significant 9 bits of $\hat{v}_f$ hold the weighted sample value, $v_f \cdot w_f$; the next 3 bits are set to zero; and the most significant 4 bits of $\hat{v}_f$ hold the weight, $w_f$. The weighted average is then implemented by forming the sum, $$\hat{v} = \sum_{f=1}^{F} \hat{v}_f$$

and using $\hat{v}$ as the index to a lookup table with $2^{16}$ entries. This technique will be effective so long as the number of fields, F, does not exceed 8. Subject to this condition, the least significant 12 bits of $\hat{v}$ hold the sum of the weighted sample values and the most significant 4 bits hold the sum of the weights so that a table lookup operation is sufficient to recover the weighted average.

4 Performance

Although the multi-field enhancement system disclosed in this document may appear to involve numerous operations, it should be noted that an efficient implementation need not make exorbitant demands on the computing or memory resources of a general purpose computer. This is because the numerous intermediate results required to implement the various sub-systems described earlier, may be generated and discarded incrementally on a row-by-row basis. Moreover, intermediate results may often be shared among the different sub-systems. Many parameters such as filter coefficients and dimensions have been selected with a view to implementation efficiency. As an example, to process four full color video fields, each with 240 rows and 640 columns, the system requires a total storage capacity of only 1.1 MB, almost all of which (0.92 MB) is used to store the source fields themselves. The processing of these four fields requires about 8 seconds of CPU time on, for instance, an HP Series 735 workstation operating at 99 MHz. On a PC with a 200 MHz Pentium Pro processor, the same operation takes less than 4 seconds of CPU time. Empirical observations indicate that this multi-field processing system achieves significantly higher still image quality than conventional single field enhancement or de-interlacing techniques. Moreover the system appears to be robust to a wide range of inter-field motion, from simple camera jitter to more complex motion of scene objects.

5 Conclusion

Figure 11:
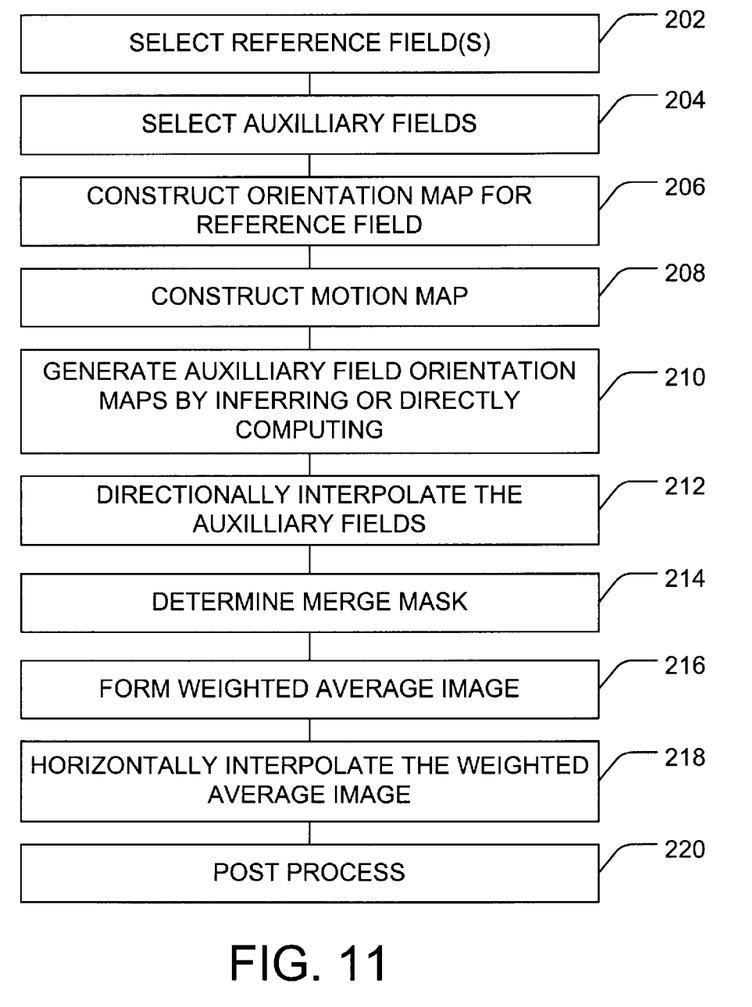
FIG. 11 is a flowchart of a method for generating an enhanced still image from multiple video fields.

Reference is now made to FIG. 11, which summarizes a method for generating an enhanced still image from multiple video fields. At least one field is selected to serve as a reference field (block 202), and the remaining fields are selected to serve as auxiliary fields (block 204). A reference field orientation map is constructed for the reference field which is used to directionally interpolate the reference field (block 206). A motion map is constructed to model local displacement between features in the reference field and corresponding features in the auxiliary fields (block 208).

An auxiliary field orientation map is then generated for each of the auxiliary fields (block 210). The auxiliary field orientation maps may be generated by computing an orientation map for each auxiliary field separately. In the alternative, the auxiliary field orientation maps may be generated by inferring an orientation map for each of the auxiliary fields directly from the orientation map of the reference field.

The reference field and auxiliary field orientation maps are used to directionally interpolate the auxiliary fields to the same resolution as the interpolated reference field (block 212). A merge mask for each auxiliary field is determined to mask off certain pixels (block 214). A weighted average image from the reference field pixels and the auxiliary field pixels which have not been masked off is formed (block 216). The weighted average image is horizontally interpolated to form the enhanced still image (block 218). Post-processing may be performed on the enhanced image (block 220).

Figure 12:
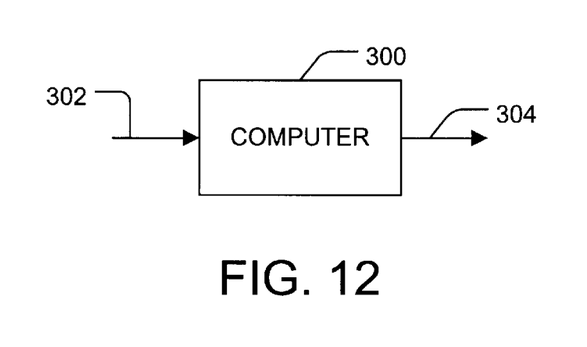
FIG. 12 is an illustration of a computer that is programmed to execute the method for generating an enhanced still image from multiple video fields.

Reference is now made to FIG. 12. This method may be implemented in software by a computer 300. The computer 300 receives the multiple video frames at a video input 302 and provides an enhanced image at a video output 304.

What is claimed is:

1. A method for generating an enhanced still image from multiple video fields having pixels, the method comprising the steps of:

(a) selecting at least one field to serve as a reference field;

(b) using remaining fields to serve as auxiliary fields;

(c) constructing a reference field orientation map for the reference field which is used to directionally interpolate the reference field;

(d) constructing a motion map to model local displacement between features in the reference field and corresponding features in the auxiliary fields;

(e) generating an auxiliary field orientation map for each of the auxiliary fields;

(f) using the auxiliary field orientation maps to directionally interpolate the auxiliary fields to the same resolution as the interpolated reference field;

(g) determining a merge mask for each auxiliary field to mask off certain pixels;

(h) forming a weighted average image from the reference field pixels, and the auxiliary field pixels which have not been masked off; and (i) horizontally interpolating the weighted average image to form the enhanced still image.

2. The method of claim 1, wherein the steps are applied to luminance components of the video fields.

3. The method of claim 1, wherein the steps are applied to chrominance components of the video fields.

4. The method of claim 3, wherein the steps are performed on the chrominance components with relatively less spatial frequency content than corresponding luminance components.

5. The method of claim 1, wherein the motion map is computed, using the directionally interpolated reference field, to sub-pixel quarter pixel accuracy in the vertical direction and half pixel accuracy in the horizontal direction.

6. The method of claim 1, wherein an auxiliary field orientation map for each of the auxiliary fields is generated by computing an orientation map for each auxiliary field separately.

7. The method of claim 1, wherein the certain pixels in step (g) correspond to regions where the motion map fails to correctly model the relationship between the reference and auxiliary fields.

8. The method of claim 1, including an additional post-processing operation which sharpens the image formed from the weighted averaging step (h).

9. The method of claim 1, wherein the horizontal interpolation of step (i) includes a horizontal interpolation factor of two.

10. The method of claim 1, wherein each auxiliary field orientation map is generated by inferring an orientation map for each of the auxiliary fields directly from the orientation map of the reference field.

11. A system for generating an enhanced still image from multiple video fields having pixels, the system comprising:

(a) a selection means for selecting at least on field to serve as a reference field, and using the remaining fields to serve as auxiliary fields;

(b) a mapping means for
      (1) constructing an orientation map for the reference field which is used to directionally interpolate the reference field;
      (ii) constructing a motion map to model local displacement between features in the reference field and corresponding features in the auxiliary fields;
      (iii) using the motion map to infer an orientation map for each of the auxiliary fields directly from the orientation map of the reference field;

(c) an interpolation means which uses the orientation maps to directionally interpolate the auxiliary fields to the same resolution as the interpolated reference field;

(d) a masking means which determines a merge mask for each auxiliary field to mask off certain pixels;

(e) an averaging means which forms a weighted average image from the reference field pixels, and the auxiliary field pixels which have not been masked off; and (f) an interpolation means which horizontally interpolates the weighted average image to form the enhanced still image.

* * * * *